US006421899B1

(12) United States Patent
Zitnay

(10) Patent No.: US 6,421,899 B1
(45) Date of Patent: Jul. 23, 2002

(54) EXTRACTION AND ADJUSTMENT TOOL FOR TANGLESS INSERTS

(75) Inventor: Roger L. Zitnay, Easton, CT (US)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/596,035

(22) Filed: Jun. 15, 2000

Related U.S. Application Data

(60) Provisional application No. 60/154,164, filed on Sep. 15, 1999.

(51) Int. Cl.[7] .......... B23P 19/04
(52) U.S. Cl. .......... 29/240.5
(58) Field of Search .......... 29/240.5, 227; 81/440–445, 450

(56) References Cited

U.S. PATENT DOCUMENTS 2,244,824 A 6/1941 Caminez

*Primary Examiner*—Robert C. Watson
(74) *Attorney, Agent, or Firm*—Harness, Dickey & Pierce, P.L.C.

(57) ABSTRACT

An extraction and adjustment tool for tangless helically coiled wire inserts according to the invention includes a mandrel with a leading portion having a tooth for reception in a recess of the insert for left-hand rotation of the insert. An end opposite the leading portion is received in a bushing of a handle portion for connecting the mandrel to the handle. Left-hand rotation of the handle contracts the insert about the leading portion of the mandrel to facilitate adjustment or removal of the insert.

19 Claims, 5 Drawing Sheets

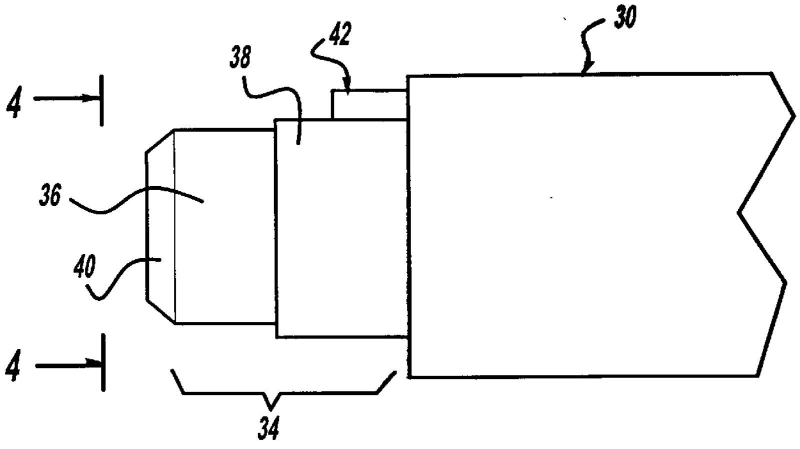
Figure - 3
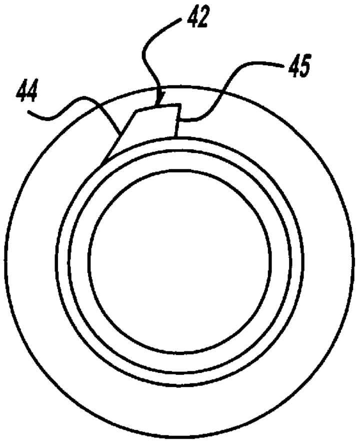
Figure - 4
Figure - 5
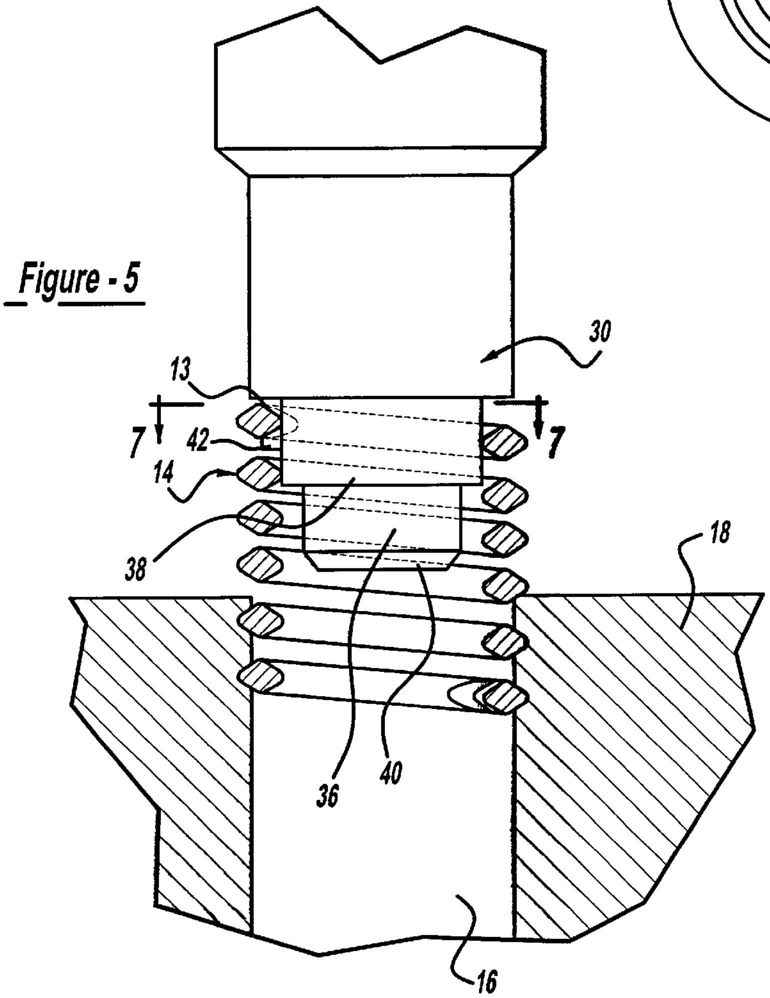

EXTRACTION AND ADJUSTMENT TOOL FOR TANGLESS INSERTS

CLAIM OF THE PRIORITY

This application claims priority to U.S. Provisional Application No. 60/154,164 filed on Sep. 15, 1999, entitled Extraction And Adjustment Tool For Tangless Inserts.

BACKGROUND OF THE INVENTION

The invention relates to a tool for helically coiled wire inserts and, more particularly, to a mechanical tool for extracting and adjusting tangless helical coil inserts.

Tools for the removal of helically coiled wire inserts are well known. Generally, these tools have a tapered blade with a pair of knife edges that are driven into the inner diameter threads of the insert. When using these tools to extract an insert, however, the insert is often permanently damaged. Thus, these tools are not useful for adjusting the placement of the insert or removing the insert for reuse.

A removal tool for tangless helically coiled wire inserts is described in U.S. Pat. No. 4,553,303 and includes a mandrel having a threaded lead portion and a pivotable pawl inserted in a groove below the threaded portion so that the pawl can engage a recess in the trailing end of the insert in order to extract the insert from the tapped hole. This pivotable pawl automatically engages the insert when the mandrel is pulled back, allowing the mandrel to extract the tangless insert. However, this known extraction tool is a relatively complicated design, and suffers from increased risks of malfunction. Further, because each insert requires a tool of complimentary size, a set of tools taught by the aforementioned patent is relatively expensive.

SUMMARY OF THE INVENTION

An extraction and adjustment tool for tangless helically coiled wire inserts includes a mandrel with a threadless lead portion having a stationary driving tooth for engaging a recess in a trailing end of the insert for adjusting or extracting the insert from a tapped hole. The tool includes a handle portion having a bushing for selective reception of a mandrel adapted to fit a particular-size helically coiled wire insert. Once the tool is inserted into the internal diameter of the insert, the stationary driving tooth engages the recess in the trailing end of the insert for extracting or adjusting an incorrectly installed insert.

BRIEF DESCRIPTION OF THE DRAWINGS

FIG. 3 is a partial side view of a lead end of the extraction and adjustment tool of FIG. 2;

FIG. 4 is an end view of the lead end of the extraction and adjustment tool of FIG. 3;

FIG. 5 is a sectional view of the lead end of the extraction and adjustment tool as shown in FIGS. 3 and 4 removing a helically coiled wire insert in a bore of a parent material;

DETAILED DESCRIPTION OF THE PREFERRED EMBODIMENT

Figure 1:
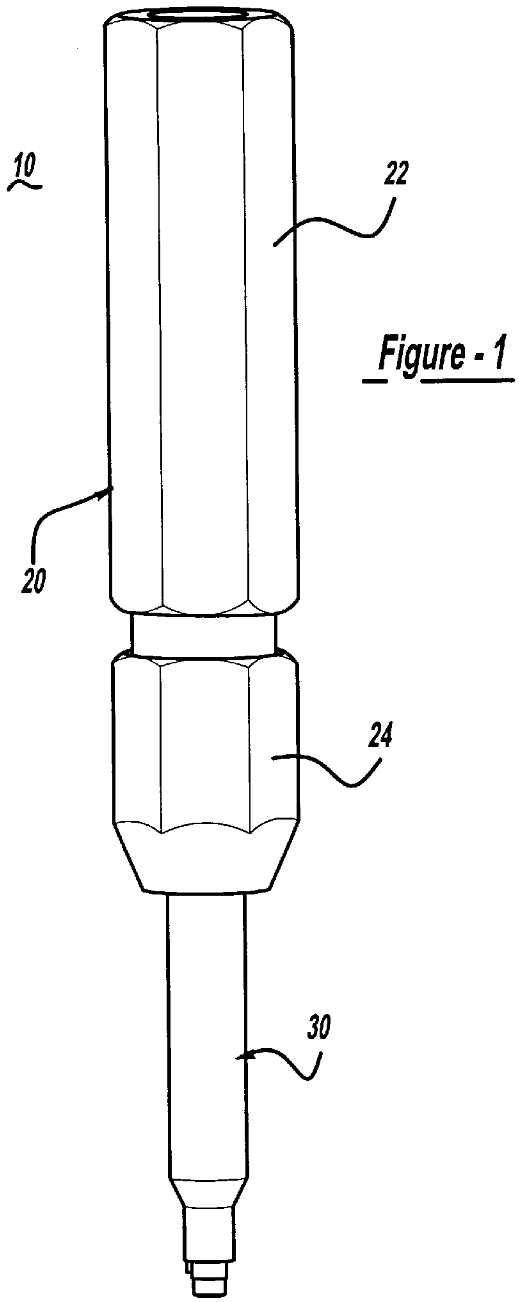
FIG. 1 is a front view of an extraction and adjustment tool for tangless inserts according to the invention.
Figure 2:
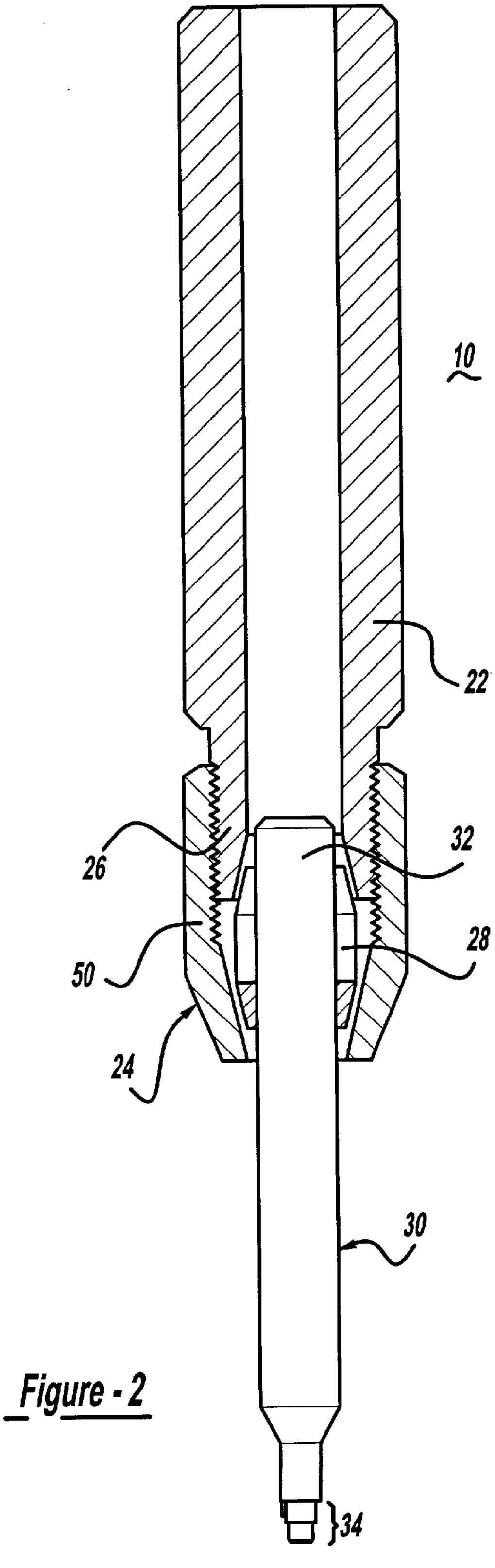
FIG. 2 is a partial sectional view of the extraction and adjustment tool of FIG. 1.
Figure 11:
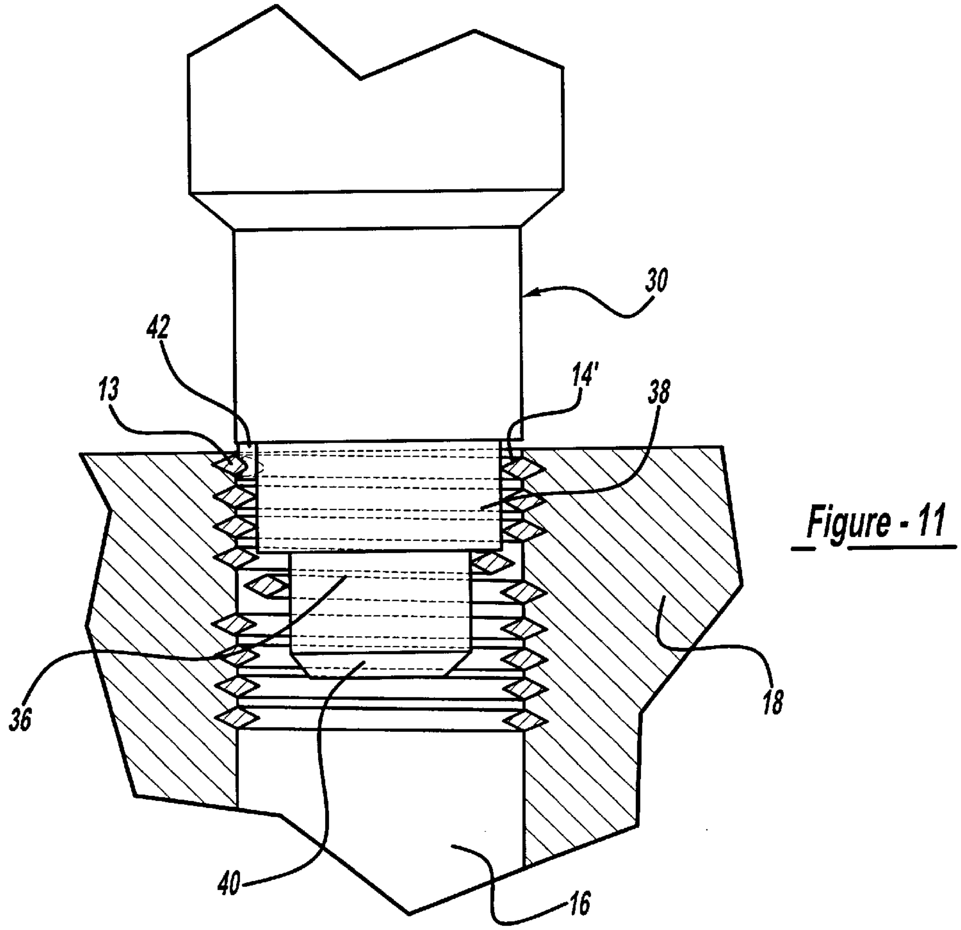
FIG. 11 is a partial sectional view of the lead end of the extraction and adjustment tool as shown in FIGS. 3 and 4 adjusting a screw-lock type insert in a bore of a parent material.

With reference to the drawings, and to FIGS. 1 and 2 in particular, a tool 10 for use in adjusting and extracting helically coiled tangless wire inserts is shown. Tangless inserts are used, for example, where a steel fastener having conventional threads is desired to be fastened into a material of relatively softer alloy, such as aluminum. Tool 10 of the present invention includes a body 20 having a handle 22 at one end and a coupler 24 at an opposite end. Coupler 24 selectively receives a mandrel 30 and supports mandrel 30 in removing or adjusting a tangless insert 14 in tapped hole 16 of a parent material 18, as illustrated in FIGS. 5, 6, and 11.

As shown in FIG. 2, the mandrel 30 includes an end 32 for insertion into coupler 24 which selectively compresses a bushing 28 on end 32. Coupler 24 includes a nut portion 50 having an internal screw thread for tightening on an external screw thread cut in end portion 26 of handle 22. When fully tightened on end portion 26, nut portion 50 of coupler 24 compresses bushing 28 against end 32 of mandrel 30, thereby securing mandrel 30 to body 20 of tool 10. Preferably, the diameter of mandrel 30 pilots on the inner diameter of the tapped hole 16.

At an end opposite end 32, the mandrel 30 includes a lead portion 34, which has a larger diameter portion 38 approximating an inner diameter of tangless insert 14 when insert 14 is installed in tapped hole 16 and expanded against parent material 18. More specifically, the larger diameter portion 38 of lead portion 34 is slightly smaller than the inner diameter of insert 14 in its installed state, thereby facilitating axial insertion into an installed insert 14. Further, with reference to FIG. 3, cylindrical lead portion 34 includes a smaller diameter leading end 36 adjacent the larger diameter inner portion 38. Smaller diameter leading end 36 is adapted to pilot on mid-grip flats of screw-lock type tangless inserts 14', as shown in FIG. 11, and described further below. A ramped leading edge 40 of the lead portion 34 facilitates insertion of mandrel 30 into tangless insert 14.

Figure 6:
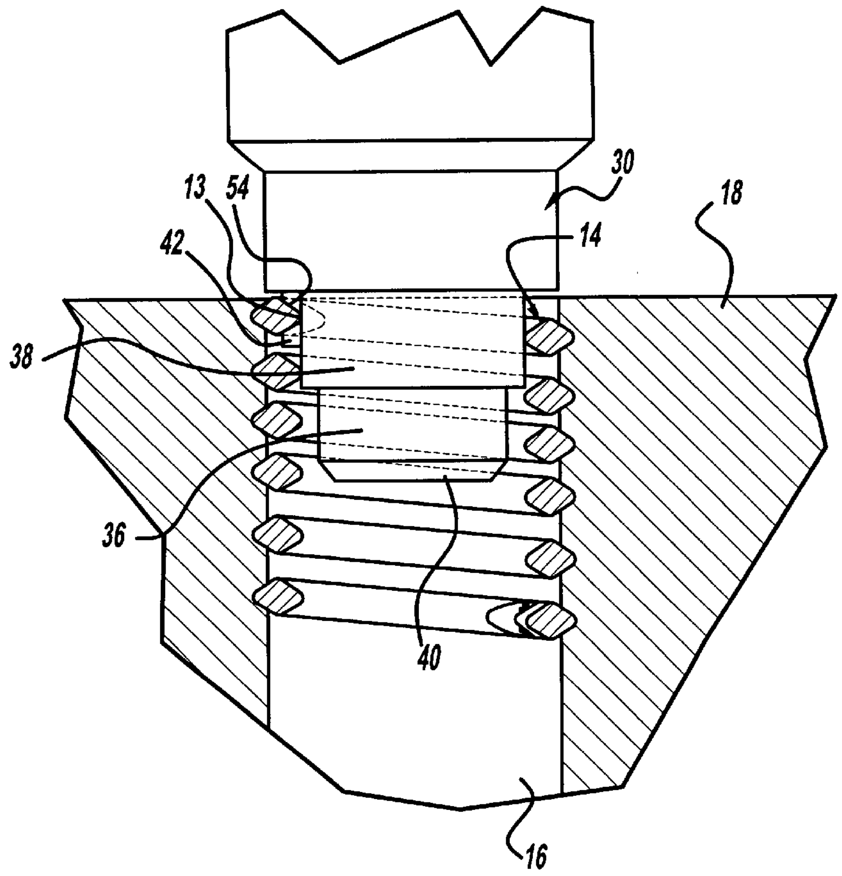
FIG. 6 is a partial sectional view of the lead end of the extraction and adjustment tool as shown in FIGS. 3 and 4 adjusting a helically coiled wire insert in a bore of a parent material.
Figure 7:
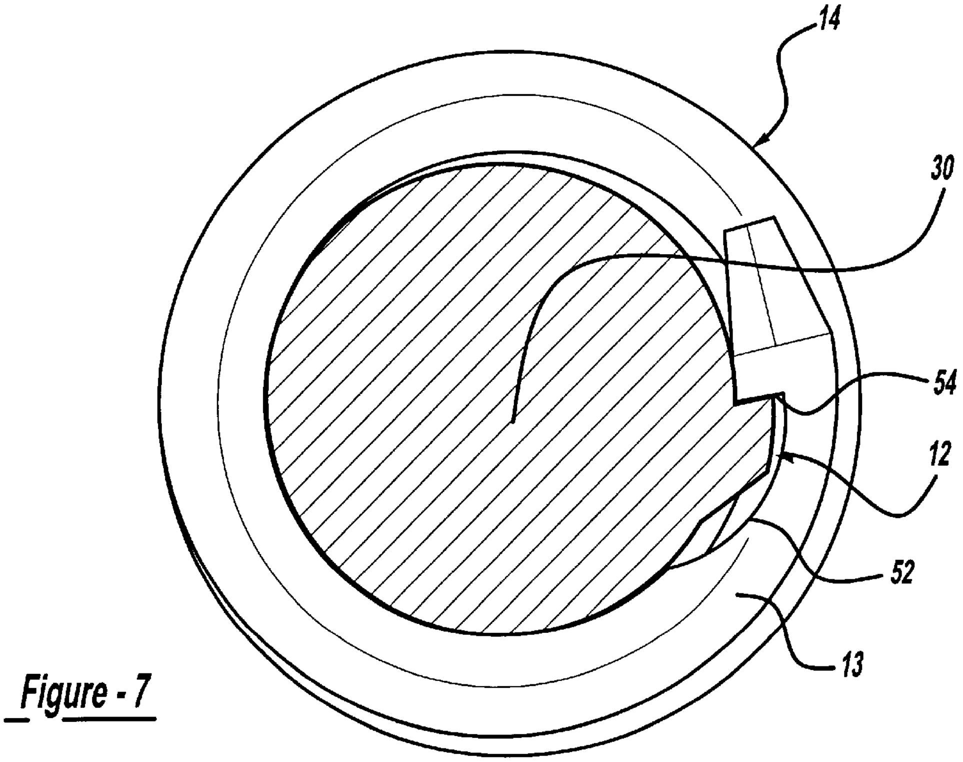
FIG. 7 is a partially sectioned top view of the lead end of the extraction and adjustment tool as shown in FIGS. 5 and 6 engaging the inner diameter of the helically coiled wire insert.

As shown in FIGS. 5–7, tangless insert 14, such as that described in U.S. Pat. No. 4,645,398, includes a recess 12 on a trailing end 13. As shown best in FIG. 7, recess 12 includes a lead wall portion 54 generally raked between 5° to 15°. Also, recess 12 includes a camming surface 52 for locating the tooth or pawl of an extraction tool against lead wall portion 54. Tool 10 uses this same recess 12 for adjusting or removing tangless insert 14.

A left-hand driving tooth 42 on the larger diameter portion 38 is adapted to engage the recess 12 of trailing end 13 of tangless insert 14, as illustrated in FIG. 5. As shown in FIG. 4, tooth 42 includes a ramp 44 for camming on surface 52 of recess 12 to facilitate removal of tooth 42 from the recess 12 of the insert 14 and a shoulder 45 for hooking lead wall 54 of recess 12 to facilitate removal and adjustment of insert

14. Upon location of tooth 42 in recess 12, left-hand rotation of mandrel 30 causes tooth 42 to hook in recess 12, whereby insert 14 contracts about lead portion 34 of mandrel 30. More specifically, shoulder 45 strikes lead wall 54, forcing insert 14 to tighten about lead portion 34, whereby insert 14 is no longer expanded against parent material 18. Once contracted, continued left-hand driving force of mandrel 30, against tangless insert 14 permits adjustment or removal. Upon proper adjustment, even slight right-hand rotation (approximately ¼ turn) of mandrel 30 will disengage tooth 42 from recess 12 and return insert 14 to an expanded state against parent material 18.

Figure 9:
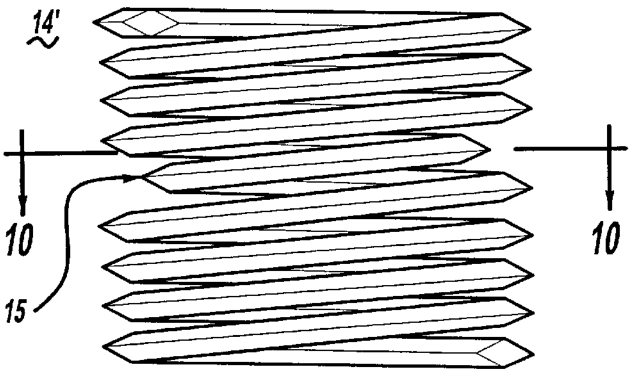
FIG. 9 is a side view of a screw-lock type insert for use with the extraction and adjustment tool of FIG. 1.
Figure 10:
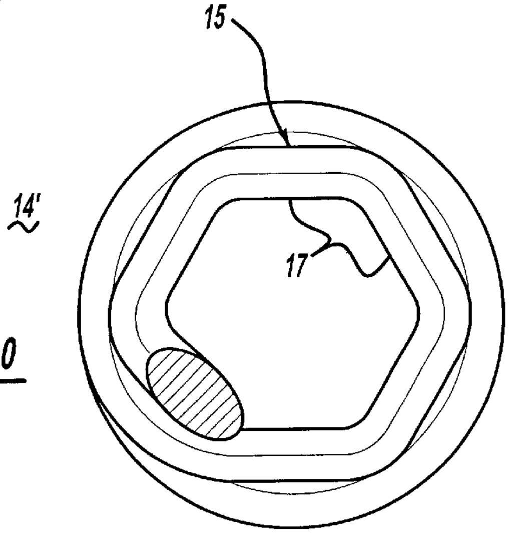
FIG. 10 is a sectional view of the screw-lock type insert of FIG. 9.

With reference to FIGS. 9–11, a screw-lock type insert 14' is illustrated. The insert 14' includes a reduced coil 15, preferably disposed intermediately among the series of coils of insert 14'. As shown best in FIG. 10, the reduced coil 15 has a generally hexagonal inner diameter including mid-grip flats 17. The smaller diameter leading end 36 of the lead portion 34 is adapted to pilot on the mid-grip flats 17 of the screw-lock type insert 14', as best shown in FIG. 11. The engagement of the smaller diameter portion 36 on the mid-grip flats 17 of the reduced coil 15 facilitates removal and adjustment of the screw-lock type insert 14'.

To use tool 10, the user simply inserts lead portion 34 of mandrel 30 into an insert 14, 14' installed in tapped hole 16 of parent material 18 until tooth 42 is proximate recess 12 on the trailing end 13 of the insert 14, 14'. Left-hand rotation of tool 10 allows the user to locate tooth 42 in recess 12. Once located, tooth 42 is positioned to adjust or remove insert 14, 14' through left-hand rotation of tooth 42. For removal, continued left-hand rotation of tooth 42 removes insert 14, 14' from tapped hole 16, whereupon right-hand rotation of mandrel 30 relative to insert 14, 14' will disengage tooth 42 from recess 12. For adjustment, selective left-hand rotation of tool 10 allows a user to properly locate insert 14, 14' in tapped hole 16. Of course, a conventional installation tool (not shown) can be used with tool 10 to properly locate insert 14, 14' through right-hand rotation of insert 14, 14'. This is significant because prior removal tools tended to damage insert 14 if adjustment was attempted. In the case of an insert 14', the smaller diameter leading end 36 of the lead portion 34 pilots on the mid-grip flats 17 of the screw-lock type insert 14' to further facilitate adjustment and/or removal of the insert 14'.

The tool 10 allows adjustment or removal of a tangless helical coil insert 14, 14' after it has been installed in tapped hole 16 of parent material 18. Tool 10 provides removal or adjustment of the insert 14, 14' without causing damage to the insert 14, 14' or parent material 18. Accordingly, tool 10 provides a relatively simple and inexpensive way to remove or adjust an incorrectly installed or damaged insert 14, 14'.

Figure 8:
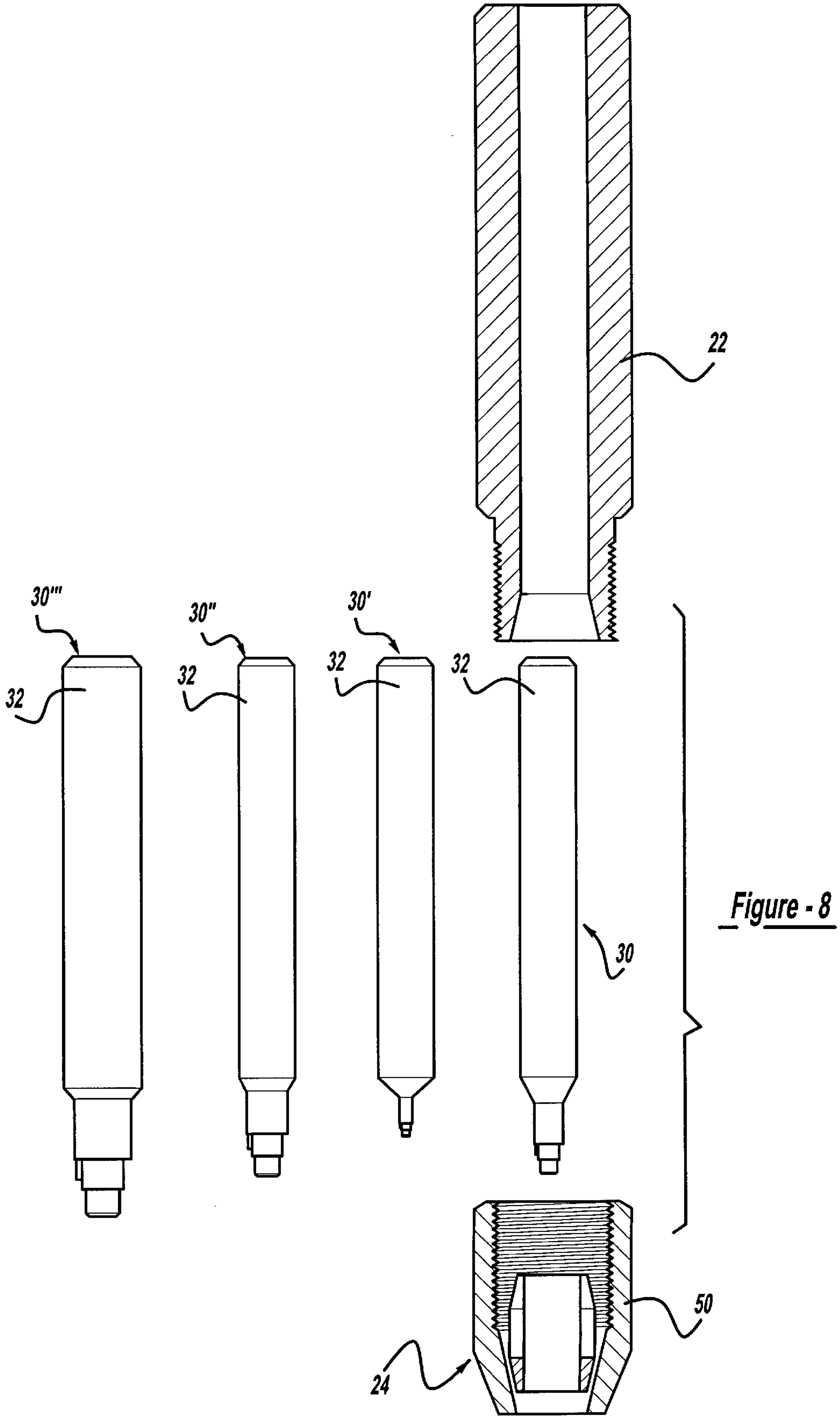
FIG. 8 is a partially sectioned exploded view of the extraction and adjustment tool for tangless inserts with a series of mandrels according to the invention.

While the aforementioned tool 10 has been described as including a single mandrel 30, it is preferred to provide a series of mandrels 30 of different sizes corresponding to different-sized tangless inserts 14, 14', as shown in FIG. 8. Thus, an extraction and adjustment tool set 10 includes a single tool body 20 for adjusting or removing different-sized tangless inserts 14, 14' by simply selecting a mandrel 30, 30', 30", or 30'" corresponding in size to the tangless insert 14, 14' to be adjusted or removed. Coupler 24 provides simple connection of a selected mandrel 30 to handle 22. Further, mandrel 30 includes end 32, which is sized for use with various commercial types of handles or other types of mechanical holders. As shown, mandrel body is generally circular in cross-section, but can be made any shape, such as square or hexagonal, for example. Accordingly, mandrel 30 according to the invention can be used independently of body 20 of tool 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An extraction and adjustment tool for tangless helically coiled wire inserts having a recess in a trailing end thereof, said tool comprising:

a mandrel having a leading portion and an end opposite said leading portion, said leading portion including a tooth for reception of said recess of said insert for left-hand driving of said insert; and a body including a handle and connected to said end of said mandrel, whereby left-hand rotation of said handle contracts said insert about said leading portion of said mandrel to facilitate adjustment or removal of said insert.

2. The extraction and adjustment tool according to claim 1, wherein said tooth includes a shoulder for hooking a lead wall of said recess upon left-hand rotation of said handle and a ramp for facilitating removal of said mandrel from said insert upon right-hand rotation of said handle.

3. The extraction and adjustment tool according to claim 1, wherein said body includes a coupler for selectively securing said end of said mandrel to said handle.

4. The extraction and adjustment tool according to claim 3, wherein said body includes a bushing for receiving said end of said mandrel and said coupler compresses said bushing about said end of said mandrel to selectively secure said mandrel to said handle.

5. The removal and extraction tool according to claim 1, wherein said leading portion of said mandrel includes a smaller diameter leading end adjacent a larger diameter portion.

6. The extraction and adjustment tool according to claim 5, wherein said smaller diameter leading portion includes a ramped leading edge.

7. The extraction and adjustment tool according to claim 5 wherein said smaller diameter portion is adapted to pilot on mid-grip flats of said tangless helically coiled insert.

8. A mandrel for use with a tool for adjusting or removing tangless helically coiled wire inserts having a recess and a trailing end thereof, said mandrel comprising:

a body having a leading portion and an end opposite said leading portion, said leading portion including a tooth for reception in said recess of said insert for left-hand driving said insert, said end adapted to selectively secure said mandrel to said extraction and adjustment tool.

9. The mandrel according to claim 8, wherein said tooth includes a shoulder for hooking a lead wall of said recess upon left-hand rotation of said mandrel and a ramp for facilitating removal of said mandrel from said insert upon right-hand rotation of said mandrel.

10. The mandrel according to claim 8, wherein said leading portion of said mandrel includes a smaller diameter leading end adjacent a larger diameter portion.

11. The mandrel according to claim 10, wherein said smaller diameter leading end includes a ramped leading edge.

12. The mandrel according to claim 10 wherein said smaller diameter portion is adapted to pilot on mid-grip flats of said tangless helically coiled insert.

13. An extraction and adjustment tool set for tangless helically coiled wire inserts having a recess and a trailing end thereof, said tool set comprising:

multiple mandrels, each mandrel of said multiple mandrels having a leading portion and an end opposite said leading portion, each of said leading portions differing in diameter and including a tooth for reception in said recess of said insert for left-hand driving said insert; and a body including a handle and a bushing, said bushing selectively receiving said end of one of said multiple mandrels, whereby left-hand rotation of said handle contracts said insert about said leading portion of said mandrel to facilitate adjustment or removal of said insert, whereby a mandrel complementing an inner diameter of said insert is selected from said multiple mandrels to facilitate adjustment or removal of said insert.

14. The extraction and adjustment tool set according to claim 13, wherein said tooth includes a shoulder for hooking a lead wall of said recess upon left-hand rotation of said handle and a ramp for facilitating removal of said mandrel from said insert upon right-hand rotation of said handle.

15. The extraction and adjustment tool set according to claim 13, wherein said body includes a coupler for selectively securing said end of one of said multiple mandrels to said handle.

16. The extraction and adjustment tool set according to claim 15, wherein said body includes a bushing for receiving said end of one of said multiple mandrels and said coupler compresses said bushing about said end to selectively secure one of said multiple mandrels to said handle.

17. The extraction and adjustment tool set according to claim 13, wherein each of said leading portions includes a smaller diameter leading end adjacent a larger diameter portion.

18. The extraction and adjustment tool set according to claim 17, wherein said smaller diameter leading portion includes a ramped leading edge.

19. The extraction and adjustment tool set according to claim 17, wherein said smaller diameter leading end includes a ramped leading edge.

* * * * *